(12) United States Patent
Wu et al.

(10) Patent No.: US 10,708,841 B2
(45) Date of Patent: Jul. 7, 2020

(54) DEVICE AND METHOD FOR NETWORK SELECTION AND NETWORK SWITCHING

(71) Applicant: TONGYU COMMUNICATION INC., Zhongshan City, Guangdong Province (CN)

(72) Inventors: Zhonglin Wu, Zhongshan (CN); Chibing Shen, Zhongshan (CN); Huaicheng Zhao, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 0 days.

(21) Appl. No.: 15/736,295

(22) PCT Filed: Jun. 17, 2015

(86) PCT No.: PCT/CN2015/081642
§ 371 (c)(1),
(2) Date: Dec. 13, 2017

(87) PCT Pub. No.: WO2016/201638
PCT Pub. Date: Dec. 22, 2016

(65) Prior Publication Data
US 2019/0082369 A1    Mar. 14, 2019

(51) Int. Cl.
*H04W 36/32* (2009.01)
*H04W 36/14* (2009.01)
*H04W 36/00* (2009.01)
*H04W 4/02* (2018.01)
*H04W 8/08* (2009.01)
*H04W 36/30* (2009.01)
*H04W 48/18* (2009.01)

(52) U.S. Cl.
CPC ............ *H04W 36/32* (2013.01); *H04W 4/027* (2013.01); *H04W 8/08* (2013.01); *H04W 36/0058* (2018.08); *H04W 36/14* (2013.01); *H04W 36/30* (2013.01); *H04W 48/18* (2013.01)

(58) Field of Classification Search
CPC combination set(s) only.
See application file for complete search history.

(56) References Cited

U.S. PATENT DOCUMENTS

2011/0116436 A1*  5/2011  Bachu .................... H04L 5/0048
370/312
2012/0122515 A1*  5/2012  Han ....................... H04W 36/32
455/525

(Continued)

FOREIGN PATENT DOCUMENTS

CN    102769879 A    11/2012
CN    104602260 A    5/2015
(Continued)

Primary Examiner — Yee F Lam
(74) Attorney, Agent, or Firm — Oliff PLC

(57) ABSTRACT

A network device and method for network selection and network switching are provided. The network device is communicating with user equipment (UE). The network device includes a processor and a memory for storing instructions executable by the processor. The processor is configured to request the UE to report speed information, receive a measurement report from the UE, the measurement report including speed information of the UE, and determine whether to switch network for the UE based on the speed information.

16 Claims, 4 Drawing Sheets

(56) References Cited

U.S. PATENT DOCUMENTS

| | | | | |
|---|---|---|---|---|
| 2012/0129517 | A1* | 5/2012 | Fox | H04L 41/5025 455/425 |
| 2012/0252463 | A1* | 10/2012 | Zou | G01S 5/14 455/441 |
| 2013/0045735 | A1* | 2/2013 | Kim | H04W 36/0094 455/422.1 |
| 2013/0295951 | A1* | 11/2013 | Mach | H04W 36/32 455/456.1 |
| 2014/0219254 | A1* | 8/2014 | Fujishiro | H04W 24/10 370/332 |
| 2015/0094102 | A1* | 4/2015 | Jung | H04W 24/10 455/456.6 |
| 2015/0141018 | A1* | 5/2015 | Kapoulas | H04W 36/00 455/437 |
| 2015/0189568 | A1* | 7/2015 | Stanze | H04B 7/0417 370/331 |
| 2016/0227458 | A1* | 8/2016 | Lee | H04W 36/165 |

FOREIGN PATENT DOCUMENTS

| | | |
|---|---|---|
| EP | 2735195 A1 | 5/2014 |
| EP | 2744268 A2 | 6/2014 |

* cited by examiner

DEVICE AND METHOD FOR NETWORK SELECTION AND NETWORK SWITCHING

CROSS REFERENCE TO RELATED APPLICATIONS

The present application is a 35 U.S.C. § 371 National Phase conversion of International (PCT) Patent Application No. PCT/CN2015/081642, filed on Jun. 17, 2015, the disclosure of which isincorporated by reference herein. The PCT International Patent Application was filed and published in English.

FIELD OF THE DISCLOSURE

The present disclosure relates to a telecommunication system and method and, more particularly, to a telecommunication system and method for network selection and switching.

BACKGROUND

Network selection and switching technology is one of the key technologies of mobile communication network. In a traditional network selection and switching technology, a decision of network selection and network switching is made based on Reference Signal Received Strength (RSRP) or Reference Signal Received Quality (RSRQ). However, in some scenarios, for example, when user equipment is moving in high speed, or when there are multiple network coverage areas or network interference complex areas, the traditional network selection and switching technology based on RSRP and RSRQ may not provide an optimal network selection and switching scheme that satisfies various user requirements.

SUMMARY

According to a first aspect of the present disclosure, a network device communicating with user equipment (UE) is provided. The network device includes a processor and a memory for storing instructions executable by the processor. The processor is configured to request the UE to report speed information, receive a measurement report from the UE, the measurement report including speed information of the UE, and determine whether to switch network for the UE based on the speed information.

According to a second aspect of the present disclosure, a method for use in a network device communicating with user equipment (UE) is provided. The method includes requesting the UE to report speed information, receiving a measurement report from the UE, the measurement report including speed information of the UE, and determining whether to switch network for the UE based on the speed information.

According to a third aspect of the present disclosure, user equipment (UE) communicating with a network device is provided. The UE includes a processor and a memory for storing instructions executable by the processor. The processor is configured to receive a request from the network device for reporting speed information, acquire speed information, and transmit the speed information to the network device.

The accompanying drawings, which are incorporated in and constitute a part of this application, illustrate disclosed embodiments and, together with the description, serve to explain the disclosed embodiments.

DETAILED DESCRIPTION

Reference will now be made in detail to the present embodiments, examples of which are illustrated in the accompanying drawings. Wherever possible, the same reference numbers will be used throughout the drawings to refer to the same or like parts.

Figure 1:
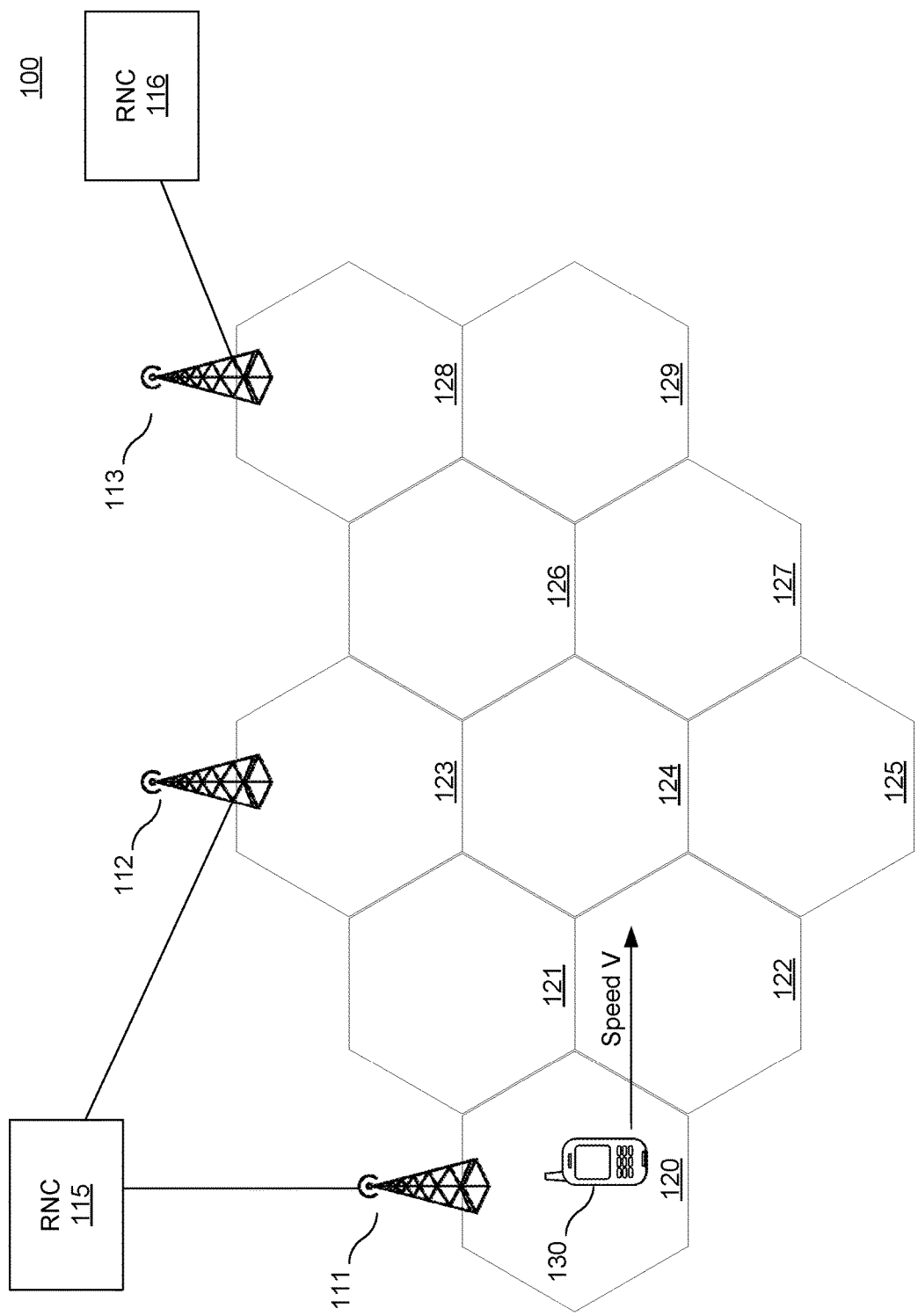
FIG. 1 illustrates an exemplary telecommunication system in which various embodiments of the disclosure are applicable to be implemented.

FIG. 1 illustrates an exemplary telecommunication system 100 in which various embodiments of the disclosure are applicable to be implemented. As illustrated in FIG. 1, system 100 includes, e.g., a first evolved Node B (eNB) 111, a second eNB 112, and a third eNB 113. First eNB 111 and second eNB 112 are controlled by a first Radio Network Controller (RNC) 115. Third eNB 113 is controlled by a second RNC 116. First through third eNBs 111-113 are associated with and serve a plurality of networks, and each network may correspond to a set of cells, such as ones of cells 120-129. User equipment (UE) 130 is connected with a first network associated with first eNB 111. Hereinafter, first eNB 111 is referred to as a serving eNB 111. As UE 130 is moving at a speed V, as indicated by an arrow in FIG. 1, serving eNB 111 determines whether or not to switch the connection of UE 130 from the first network to another network.

Although system 100 illustrated in FIG. 1 includes one UE 130, three eNBs 111-113, and ten cells 120-129, those skilled in the art would appreciate that system 100 can include more or less than the number of devices illustrated in FIG. 1. In addition, although various embodiments of the disclosure are described in the context of UEs and eNBs, those skilled in the art would appreciate that the disclosure is applicable to other similar devices. For example, eNBs may be referred to or implemented as base stations or access points, and UEs may be referred to or implemented as mobile terminals or access terminals.

Figure 2:
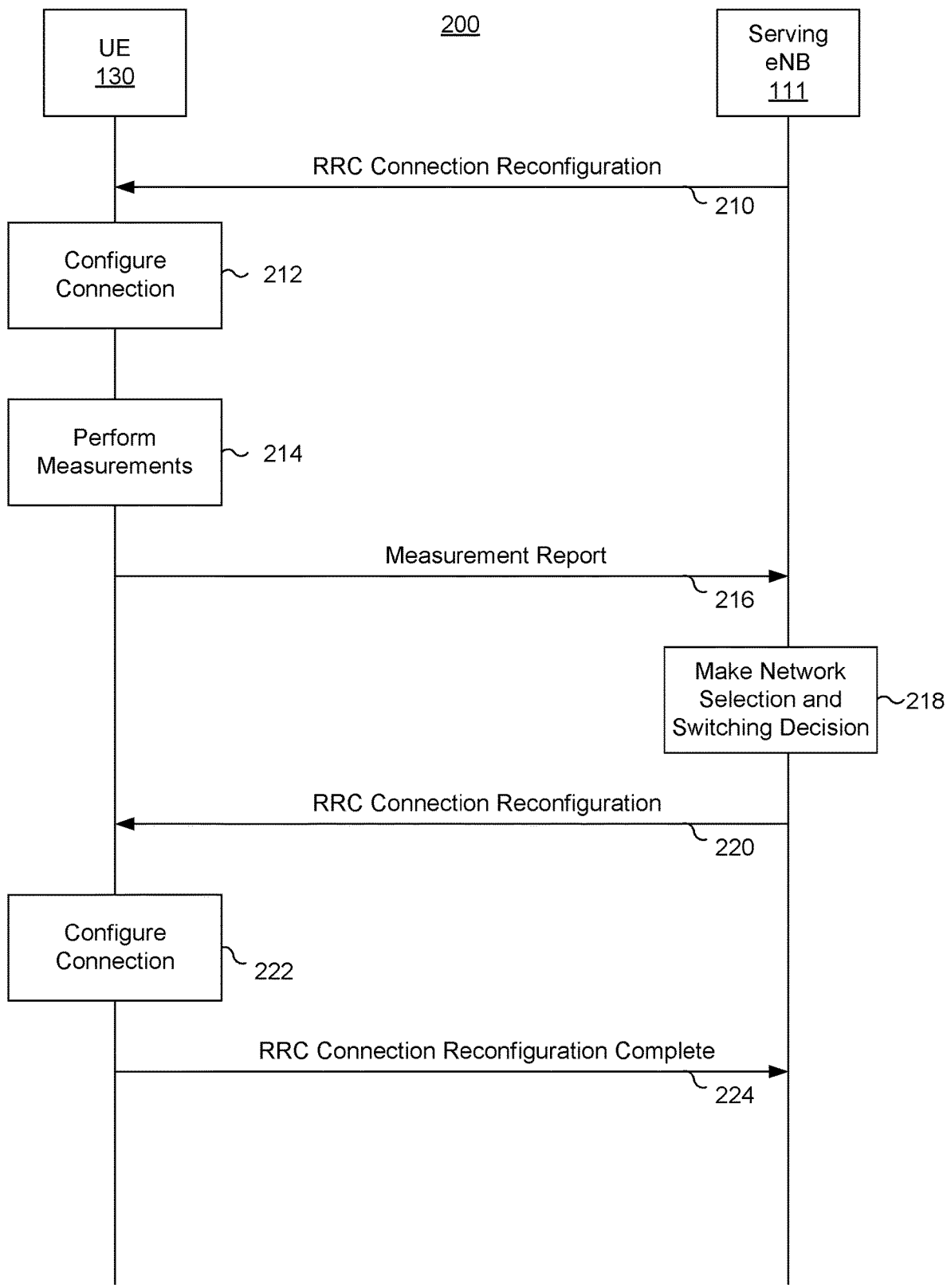
FIG. 2 is a signaling diagram of a network selection and switching method, according to an exemplary embodiment of the disclosure.

FIG. 2 is a signaling diagram of a network selection and switching method 200, according to an exemplary embodiment of the disclosure. Referring to FIGS. 1 and 2, in the exemplary embodiment, before method 200 starts, UE 130 has connected to the network corresponding to cell 120.

As illustrated in FIG. 2, first, serving eNB 111 transmits a Radio Resource Control (RRC) Connection Reconfiguration signal to UE 130 via first network 111 (step 210), requiring UE 130 to report various measurement information to serving eNB 111. For example, serving eNB 111 may request UE 130 to report its location information and speed information to serving eNB 111.

In response to the RRC Connection Reconfiguration Signal, UE 130 configures its connection to prepare for providing the measurement information requested by serving eNB 111 (step 212). Then, UE 130 obtains measurement information to be reported to serving eNB 111 (step 214). For example, UE 130 may measure values of Reference Signal Received Power (RSRP) and Reference Signal Received Quality (RSRQ) on each one of downlink signals received from eNB 111 and adjacent eNBs, such as second eNB 112 and third eNB 113. UE 130 may also acquire its location and speed information.

UE 130 uploads a measurement report to serving eNB 111 to report the measurement information (step 216). The measurement report includes, e.g., the measured values of RSRP and RSRQ of the downlink signal from serving eNB 111, measured values of RSRP and RSRQ of adjacent cells, as well as the location and speed information of UE 130.

Based on the information included in the measurement report, serving eNB 111 makes network selection and switching decision (step 218). For example, serving eNB 111 determines whether to switch network for UE 130, and which network should UE 130 be connected with. If serving eNB 111 determines that UE 130 needs to switch network, serving eNB 111 transmits an RRC Connection Reconfiguration signal to UE 130 (step 220), informing UE 130 about a network identification (ID) of the new network that UE 130 should be connected with (hereinafter referred to as "target network").

In response to receiving the RRC connection reconfiguration signal including the network ID of the target network, UE 130 configures its connection to connect to the target network (step 222). After UE 130 is connected to the target network, UE 130 transmits an RRC Connection Reconfiguration Complete signal to serving eNB 111 (step 224), informing serving eNB 111 that it has been connected to the target network.

In step 214 noted above, UE 130 can acquire its location information using a wireless location system, and then determine its speed information based on the location information. For example, the wireless location system can be one of the following first, second, and third systems.

The first system is a network location system. The network location system includes a plurality of fixed beacons that are communicating with a location server. Each fixed beacon receives an uplink signal transmitted from UE 130 at substantially the same time, extracts location parameters from the uplink signal by using a same or similar method, and transmits the extracted location parameters to the location server. The location server calculates the location information of UE 130 based on the location parameters transmitted from the fixed beacons, and transmits the location information to UE 130. In this process, UE 130 is only responsible for transmitting the uplink signal and does not participate in using the signal to obtain the location information.

The second system is a location system in UE 130. In this system, UE 130 receives downlink signals simultaneously transmitted from a plurality of fixed beacons, extracts location parameters from the downlink signals, and transmits the extracted location parameters to a location server. The location server then calculates the location information of UE 130 based on the location parameters transmitted from UE 130, and transmits the location information to UE 130. In this process, UE 130 maintains a state of active calling, and extracts the location parameters.

The third system is a network-assisted location system. In this system, each one of a plurality of fixed beacons receives an uplink signal transmitted from UE 130 at substantially the same time, extracts location parameters from the uplink signal by using a same or similar method, and transmits the extracted location parameters to UE 130. UE 130 then calculates its location information based on the location parameters transmitted from the fixed beacons. In such system, UE 130 not only transmits the uplink signal, but also calculates the location information by itself.

Besides acquiring its location information using a wireless location system, UE 130 can also acquire its speed information. For example, UE 130 may include a built-in sensor, such as a piezoelectric acceleration sensor, for measuring its acceleration information. UE 130 then calculates its speed information based on the acceleration information.

Figure 3:
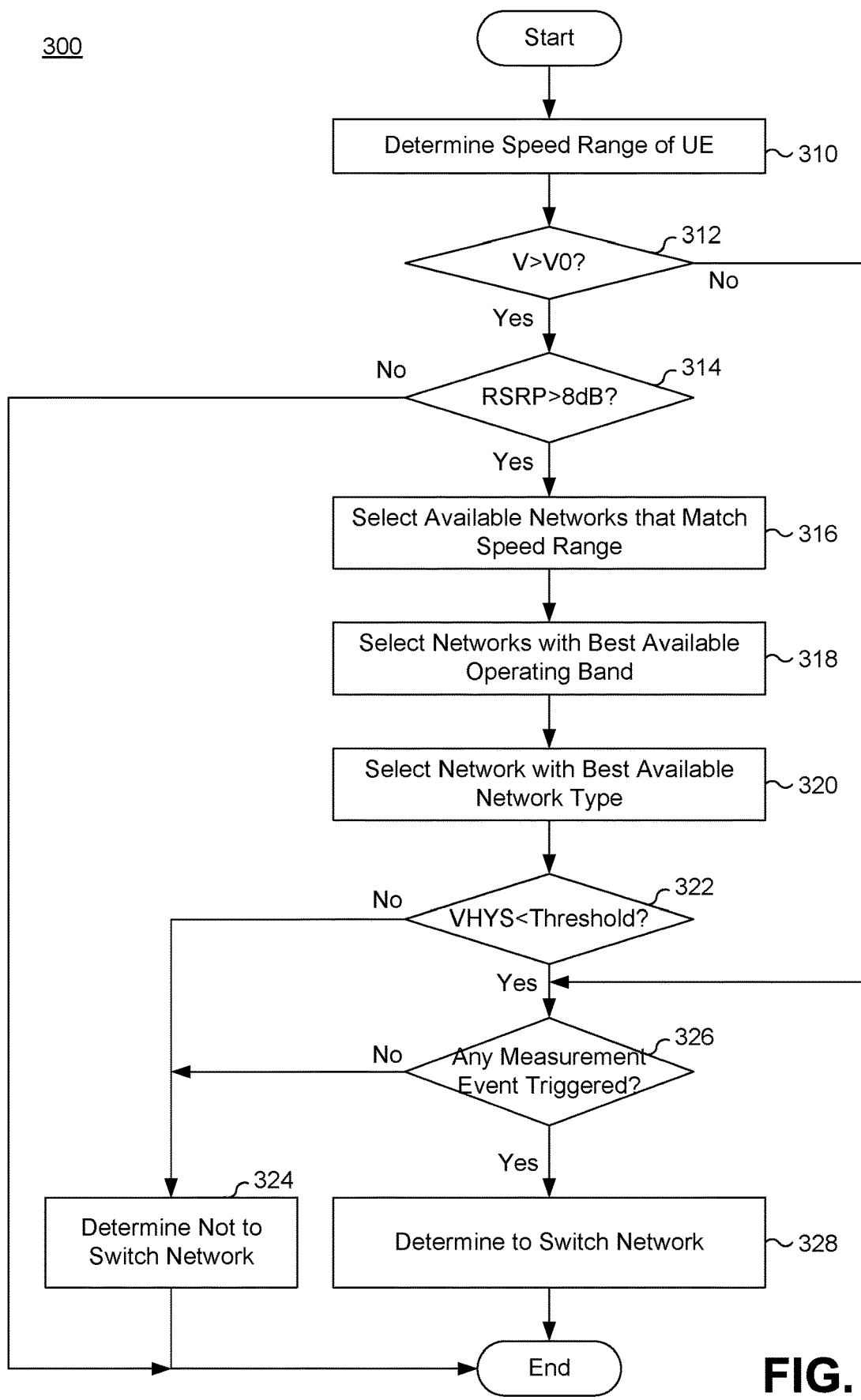
FIG. 3 illustrates a flow chart of a method of network selection and switching, according to an exemplary embodiment of the disclosure.

FIG. 3 illustrates a flow chart of a method 300 performed by serving eNB 111 to make network selection and switching decision, according to an exemplary embodiment of the disclosure. For example, serving eNB 111 performs method 300 when performing step 218 of method 200 (FIG. 2).

As illustrated in FIG. 3, when serving eNB 111 receives information regarding speed V of UE 130, serving eNB 111 determines which one of a plurality of pre-defined speed ranges does speed V of UE 130 belongs to (step 310). For example, the plurality of pre-defined speed ranges may include [0, V1], [V1, V2], [V3, V4], . . . , [Vi, +∞), where i is a positive integer, V1>0, V2>V1, V3>V2, and so on.

Serving eNB 111 also determines whether speed V of UE 130 is greater than a threshold speed V0 (step 312). If speed V of UE 130 is not greater than threshold speed V0 (step 312: No), then serving eNB 111 performs step 326, as described below.

If speed V of UE 130 is greater than threshold speed V0 (step 312: Yes), then serving eNB 111 determines whether an RSRP value of a downlink signal transmitted from serving eNB 111 to UE 130 is greater than a threshold value. The RSRP value is included in the measurement report transmitted from UE 130 in step 216 (FIG. 2). The threshold value may be a noise level such as, e.g. 8 dB. If the RSRP value is not greater than 8 dB (step 314: No), then serving eNB 111 determines that the communication between UE 130 and serving eNB 111 is lost, and method 300 ends.

If the RSRP value is greater than 8 dB (step 314: Yes), then serving eNB 111 selects a plurality of available networks that match the speed range of UE 130 (step 316). For example, serving eNB 111 may include a storage device that is pre-stored with a map including the plurality of pre-defined speed ranges, a plurality of network IDs of neighboring networks, and mapping relationships between the plurality of speed ranges and the plurality of network IDs. In this way, once serving eNB 111 determines the speed range of UE 130, serving eNB 111 looks up the map to find the networks that match the speed range of UE 130.

Serving eNB 111 then selects, from the plurality of available networks selected in step 316, one or more networks with a best available operating band (step 318). Serving eNB 111 may determine that low operating bands are preferred than high operating bands. For example, among networks with a first operating band of 700 MHz and/or 900 MHz, a second operating band of 1800 MHz and/or 2100 MHz, and a third operating band of 2600 MHz, serving eNB 111 may first select the networks with the first operating band. If there is no network with the first operating band, serving eNB 111 may select the networks with the second operating band. If there is no network with the first and second operating bands, serving eNB 111 may select the networks with the third operating band.

Afterwards, serving eNB 111 selects, from the one or more networks selected in step 318, a network with a best available network type (step 320). Serving eNB 111 may determine that a 4G network is preferred than a 3G network, and a 3G network is preferred than a 2G network. For example, if serving eNB 111 has selected several networks with the first operating band in step 318, then serving eNB 111 may select a 4G network from among the networks with the first operating band, and identify the selected 4G network as the target network for UE 130.

Serving eNB 111 may also determine whether a speed offset VHYS of UE 130 is less than a threshold offset value (step 322). The speed offset is defined as the magnitude of change of speed V in a given time period. If the speed offset VHYS is not less than the threshold offset value (step 322: No), then serving eNB 111 determines that the target network selected based on the speed V of UE 130 is not valid, since the speed V of UE 130 is changing significantly. Thus, serving eNB 111 determines not to switch network for UE 130 (step 324).

If the speed offset VHYS of UE 130 is less than the threshold offset value (step 322: Yes), then serving eNB 111 determines whether any one of a plurality of measurement events has been triggered based on the measurement information included in the measurement report transmitted from UE 130 (step 326). Table 1 summarizes the plurality of measurement events.

FIG. 2, to transmit an RRC Connection Reconfiguration signal to UE 130 to inform UE 130 about the network ID of the target network.

Figure 4:
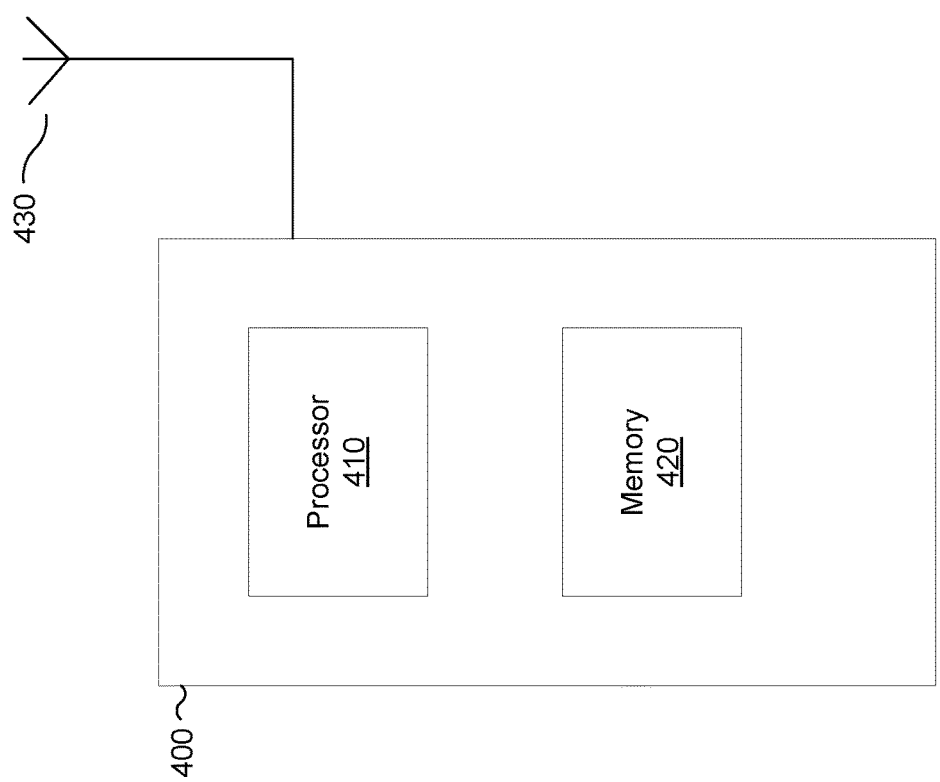
FIG. 4 illustrates a schematic diagram of an apparatus for use in practicing exemplary embodiments of the disclosure.

FIG. 4 illustrates a schematic diagram of an apparatus 400 for use in practicing exemplary embodiments of the disclosure. For example apparatus 400 may be implemented as UE 130, or eNB 111, 112, or 113.

As illustrated in FIG. 4, apparatus 400 includes a processor 410, a memory 420, and a transceiver 430. Transceiver 430 includes one or more components that transmit and/or receive signals and messages from and to apparatus 400. Memory 420 stores instructions that, when executed by processor 410, cause processor 410 to operate according to various embodiments of the disclosure. Memory 420 also stores various data used by apparatus 400. For example, if apparatus 400 is implemented as serving eNB 111, memory 420 may store the map having the mapping relationships between the plurality of speed ranges and the plurality of network IDs. Memory 420 may be of any type suitable to the local technical environment and may be implemented using any suitable data storage technology, such as semiconductor based memory devices, flash memory, magnetic memory devices and systems, optical memory devices and systems,

TABLE 1

| Measurement event | Description | Judgment condition |
| --- | --- | --- |
| Event A1 | Serving cell quality is higher than an absolute threshold | Event entry condition: Ms − Hys > Thresh<br>Event exit condition: Ms + Hys < Thresh |
| Event A2 | Serving cell quality is lower than an absolute threshold | Event entry condition: Ms + Hys < Thresh<br>Event exit condition: Ms − Hys > Thresh |
| Event A3 | Neighboring cell quality is a threshold higher than serving cell quality | Event entry condition: Mn + Ofn + Ocn − Hys > Ms + Ofs + Ocs + Off<br>Event exit condition: Mn + Ofn + Ocn + Hys < Ms + Ofs + Ocs + Off |
| Event A4 | Neighboring cell quality is higher than an absolute threshold | Event entry condition: Mn + Ofn + Ocn − Hys > Thresh<br>Event exit condition: Mn + Ofn + Ocn + Hys < Thresh |
| Event A5 | Serving cell quality is lower than an absolute threshold 1, and neighboring cell quality is higher than an absolute threshold 2 | Event entry condition: Ms + Hys < Thresh1 & Mn + Ofn + Ocn − Hys > Thresh2<br>Event exit condition: Ms − Hys > Thresh1 or Mn + Ofn + Ocn + Hys < Thresh2 |

In Table 1, Ms represents the signal strength of the serving cell, Ofs represents the frequency specific offset of the serving cell, Ocs represents the cell specific offset of the serving cell, Mn represents the signal strength of a neighboring cell, Ofs represents the frequency specific offset of the neighboring cell, Ocs represents the cell specific offset of the neighboring cell, Hys is the hysteresis parameter of the corresponding event, and Thresh is the threshold parameter for the corresponding event. If a target network has been selected, a cell associated with the target network may be used as the neighboring cell.

If no measurement event has been triggered (step 326: No), then serving eNB 111 determines not to switch network for UE 130 (step 324). If a measurement event has been triggered (step 326: Yes), then serving eNB 111 determines to switch network for UE 130 (step 328). Then, method 300 ends.

After method 300 ends, if serving eNB 111 determines to switch network for UE 130 and has selected a target network, serving eNB 111 proceed to step 220 illustrated in fixed memory and removable memory. Processor 410 may be of any type suitable to the local technical environment, and may comprise one or more of general-purpose computers, special purpose computers, microprocessors, digital signal processors (DSPs) and processors based on multi-core processor architectures, as non-limiting examples.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network device communicating with user equipment (UE), the network device comprising:
   a processor; and
   a memory for storing instructions executable by the processor; wherein
   the processor is configured to:
   request the UE to report speed information;

obtain location information of the UE via a wireless network location system that includes a plurality of fixed beacons in communication with a location server, the location information being obtained through:
  (a) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the location server, the location server calculating the location information of the UE based on the extracted location parameters transmitted from the plurality of fixed beacons, and the location server transmitting the calculated location information to the UE,
  (b) the UE receiving downlink signals simultaneously transmitted from each of the plurality of fixed beacons, the UE extracting location parameters from each of the downlink signals, the UE transmitting the extracted location parameters to the location server, the location server calculating the location information of the UE based on the extracted location parameters transmitted from the plurality of fixed beacons, and the location server transmitting the calculated location information to the UE, or
  (c) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the UE, and the UE calculating the location information of the UE based on the extracted location parameters transmitted from the plurality of fixed beacons;
determine the speed information of the UE based on the determined location information;
determine whether to switch network for the UE based on the speed information;
compare a speed offset of the UE with a threshold offset value, the speed offset being a magnitude of a change of speed in a predetermined time period; and
if the speed offset of the UE is greater than the threshold offset value, determine not to switch network for the UE.

2. The network device of claim 1, wherein the processor is further configured to:
select a target network for the UE based on the speed information.

3. The network device of claim 1, wherein the processor is further configured to:
determine a speed range for the UE based on the speed information; and
select a plurality of available networks that match the speed range of the UE.

4. The network device of claim 3, wherein the processor is further configured to:
select, from the selected plurality of available networks, one or more networks each with an available operating band.

5. The network device of claim 4, wherein
when the selected plurality of available networks include a first network with a lower operating band and a second network with a higher operating band, the processor is further configured to:
select the first network with the lower operating band.

6. The network device of claim 4, wherein the processor is further configured to:
select, from the one or more networks, a target network with a best available network type;
when the one or more networks include a fourth generation network and at least one of a third generation network and a second generation network, the processor is further configured to select the fourth generation network as the target network; and
when the one or more networks include a third generation network and a second generation network and include no fourth generation network, the processor is further configured to select the third generation network as the target network.

7. The network device of claim 1, wherein the processor is further configured to:
compare a speed of the UE with a threshold speed;
if the speed of the UE is greater than the threshold speed, select a target network for the UE based on the speed information;
if the speed of the UE is less than or equal to the threshold speed, determine whether a measurement event has been triggered; and
in response to determining that the measurement event has been triggered, determine to switch network for the UE.

8. A method for use in a network device communicating with user equipment (UE), the method comprising:
requesting the UE to report speed information;
obtaining location information of the UE via a wireless network location system that includes a plurality of fixed beacons in communication with a location server, the location information being obtained through:
  (a) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the location server, the location server calculating the location information of the UE based on the extracted location parameters transmitted from the plurality of fixed beacons, and the location server transmitting the calculated location information to the UE,
  (b) the UE receiving downlink signals simultaneously transmitted from each of the plurality of fixed beacons, the UE extracting location parameters from each of the downlink signals, the UE transmitting the extracted location parameters to the location server, the location server calculating the location information of the UE based on the extracted location parameters transmitted from the plurality of fixed beacons, and the location server transmitting the calculated location information to the UE, or
  (c) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the UE, and the UE calculating the location information of the UE based on the extracted location parameters transmitted from the plurality of fixed beacons;

determining the speed information of the UE based on the determined location information;

determining whether to switch network for the UE based on the speed information of the UE;

comparing a speed offset of the UE with a threshold offset value, the speed offset being a magnitude of a change of speed in a predetermined time period; and if the speed offset of the UE is greater than the threshold offset value, determining not to switch network for the UE.

9. The method of claim 8, further comprising:
selecting a target network for the UE based on the speed information.

10. The method of claim 9, wherein the selecting of the target network comprises:
determining a speed range for the UE based on the speed information; and
selecting a plurality of available networks that match the speed range of the UE.

11. The method of claim 10, further comprising:
selecting, from the selected plurality of available networks, one or more networks each with an available operating band;
when the selected plurality of available networks include a first network with a lower operating band and a second network with a higher operating band, the selecting of the one or more networks comprises:
selecting the first network with the lower operating band.

12. The method of claim 11, further comprising:
selecting, from the one or more networks, a target network with a best available network type;
when the one or more networks include a fourth generation network and at least one of a third generation network and a second generation network, the fourth generation network is selected as the target network; and
when the one or more networks include a third generation network and a second generation network and include no fourth generation network, the third generation network is selected as the target network.

13. The method of claim 8, further comprising:
comparing a speed of the UE with a threshold speed; and
if the speed of the UE is greater than the threshold speed, selecting a target network for the UE based on the speed information.

14. The method of claim 13, further comprising:
if the speed of the UE is less than or equal to the threshold speed, determining whether a measurement event has been triggered; and
in response to determining that the measurement event has been triggered, determining to switch network for the UE.

15. A user equipment (UE) communicating with a network device, the UE comprising:
a processor; and
a memory for storing instructions executable by the processor; wherein
the processor is configured to:
receive a request from the network device for reporting speed information of the UE;
obtain location information of the UE via a wireless network location system that includes a plurality of fixed beacons in communication with a location server, the location information being obtained through:
(a) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the location server, the location server calculating the location information of the UE based on the extracted location parameters transmitted from the plurality of fixed beacons, and the location server transmitting the calculated location information to the UE,
(b) the UE receiving downlink signals simultaneously transmitted from each of the plurality of fixed beacons, the UE extracting location parameters from each of the downlink signals, the UE transmitting the extracted location parameters to the location server, the location server calculating the location information of the UE based on the extracted location parameters transmitted from the plurality of fixed beacons, and the location server transmitting the calculated location information to the UE, or
(c) the plurality of fixed beacons each receiving an uplink signal from the UE at substantially the same time, the plurality of fixed beacons each extracting location parameters from the respective uplink signal, the plurality of fixed beacons each transmitting the respective extracted location parameters to the UE, and the UE calculating the location information of the UE based on the extracted location parameters transmitted from the plurality of fixed beacons;
determine the speed information of the UE based on the determined location information, the speed information including a speed offset, the speed offset being a magnitude of a change of speed in a predetermined time period; and
transmit the speed information to the network device.

16. The UE of claim 15, wherein the processor is further configured to:
acquire acceleration information by using an acceleration sensor; and
calculate the speed information based on the acceleration information.

* * * * *